Feb. 6, 1945.   M. J. McCOMBS   2,368,858
CHUCK
Filed Sept. 11, 1942
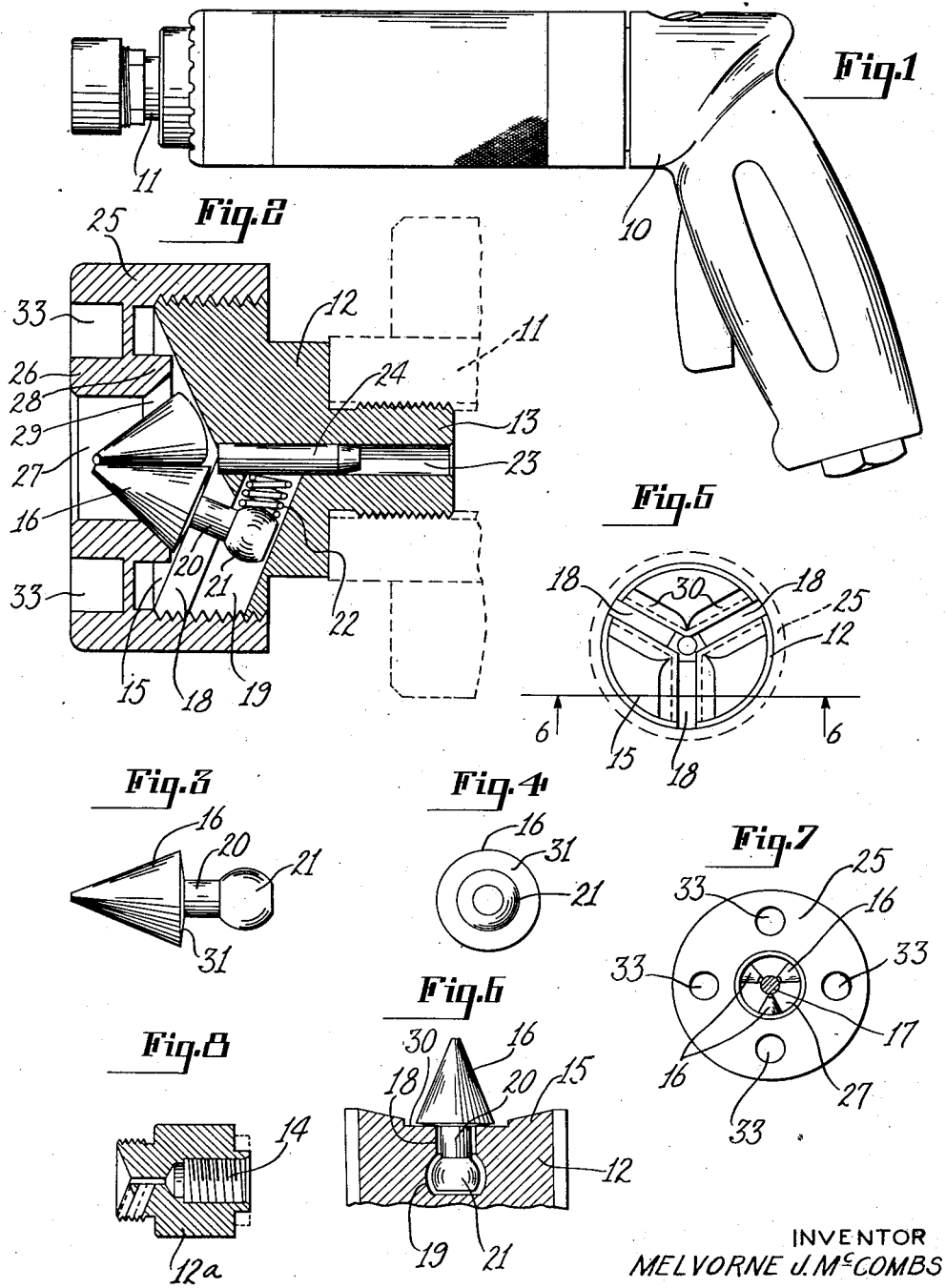
INVENTOR
MELVORNE J. McCOMBS
BY
ATTORNEY Patented Feb. 6, 1945

2,368,858

UNITED STATES PATENT OFFICE 2,368,858

CHUCK

Melvorne J. McCombs, Dayton, Ohio, assignor to Buckeye Tools Corporation, a corporation of Ohio Application September 11, 1942, Serial No. 458,013

13 Claims. (Cl. 279—64)

This invention relates to a device for releasably connecting two members and is designed primarily for use as a chuck to connect with a driving or supporting member a part to be operated or to be operated upon, such for example as a drill or a work piece in a lathe, but it is not limited to such use.

One object of the invention is to provide a connecting device of simple construction and of relatively light weight which can be easily operated to rigidly connect therewith or to disconnect therefrom a part to be supported or driven.

A further object of the invention is to provide such a device in which the gripping and releasing action of the gripping members will be rapid, prompt and positive without sacrificing efficiency.

A further object of the invention is to provide such a device in which the load on, or the resistance to the rotation of, the driven part will tend to increase the gripping action of the gripping members.

A further object of the invention is to provide a chuck which can be made of small size with relation to the device to be supported thereby and will have ample strength and durability.

A further object of the invention is to provide a chuck which will be free from projections or angles which would be liable to mar the work if the chuck came in contact therewith and which is well adapted for operation in close quarters.

A further object of the invention is to provide a chuck in which the jaws will not project beyond the face of the chuck when they are in gripping positions.

A further object of the invention is to provide such a chuck in which the jaws will be self-adjusting to accurately aline the supported device with the axis of the chuck.

A further object of the invention is to provide a chuck in which the jaws will be rotatable about individual axes as they move to gripping positions.

A further object of the invention is to provide a chuck in which the jaws will have rolling contact with the actuating device therefor and with the device to be supported.

A further object of the invention is to provide a chuck with cone-shaped jaws, the device engaging portions of which are parallel with the axis of the chuck.

Other objects of the invention may appear as the device is described in detail.

In the accompanying drawing Fig. 1 is a side elevation of a power operated tool equipped with my chuck; Fig. 2 is a section taken centrally through a chuck embodying the invention; Fig. 3 is a side elevation of one of the conical jaws; Fig. 4 is a rear elevation of such a jaw; Fig. 5 is a front elevation of the body of the chuck with the actuating member and jaws removed; Fig. 6 is a section taken on the line 6—6 of Fig. 5; Fig. 7 is a front elevation of the chuck with the jaws in gripping positions; and Fig. 8 is a sectional view of a slightly modified form of chuck body.

In the drawing I have illustrated one embodiment of my invention and have shown the same as a chuck connected with a self-contained power operated tool 10 adapted to be grasped and supported by the hand of the operator and comprising a driving member or shaft 11 with which the chuck is connected. It will be understood, however, that the invention may take various forms without departing from the spirit thereof and may be used in connection with tools or operating mechanisms of various kinds. The chuck here illustrated is designed primarily to support and drive a rotatable implement, such as a drill, but it may be used, either with or without modification, to support implements or other devices of various kinds, and the term "implement" as herein used is intended to include any device which can be supported in or driven by the chuck.

In the preferred form the chuck comprises a body 12 circular in form and having means whereby it may be attached to a suitable support, such as the driving member of a tool or other operating mechanism. As shown in Fig. 2 the body is provided with a rearwardly projecting screw threaded stud 13 which is screwed into a threaded socket in the shaft 11. In Fig. 8 the body 12a is slightly longer than the body shown in Fig. 2 and is provided with a screw threaded socket 14 to receive a threaded stud carried by the driving member. Otherwise the head of Fig. 8 is similar to that of Fig. 2. On its forward side the body 12, or 12a, is provided with an annular jaw supporting surface 15 which is preferably flared forwardly from the axis of the body and which, in the present instance, constitutes the wall of a rearwardly tapered recess in the forward portion of the body, the major diameter of that recess being preferably substantially equal to the diameter of the body 12.

A plurality of jaws 16, preferably three, are supported on the supporting surface 15 for movement toward and from each other and for rotation about individual axes and are adapted to receive between them a part of the device to be supported, such as the shank of a rotatable implement, as shown at 17 in Fig. 7. The jaws are in part at least circular in cross section and are so arranged that their adjacent or shank engaging portions will be parallel with the shank of the implement. Preferably each jaw is conical in form and the base thereof is supported on the body 12 for substantially radial movement toward and from the axis of the chuck and for rotary movement about its individual axis. The inclination of the supporting surface 15 with relation to the taper of the jaws is such that the adjacent or shank engaging portions of the conical jaws will be supported in substantial parallelism one with the other and with the axis of the chuck. The jaws may be guided in the desired paths of movement in any suitable manner and, in the construction shown, the supporting surface 15 is provided with a plurality of slots 18 each of which opens into a substantially radial bore 19 in the body and parallel to the corresponding slot, and the conical jaws are provided with stems 20 which extend through the slots 18 and have enlargements or heads 21 in the bores 19. Springs 22 confined in the respective bores 19 between the inner ends thereof and the heads 21 of the jaw stems act on the jaws to move the same outwardly from each other when such movement of the jaws is unrestrained. In order that the bores 19 may be of maximum length without permitting the ends of the springs to contact and become entangled one with the other, the body is provided with an axial bore 23 into which the radial bores 19 open and the inner ends of the radial bores are closed by a plug 24 inserted in the radial bore, this plug forming a seat for the springs.

Any suitable means may be provided for actuating the jaws which will move the same inwardly toward one another and cause them to rotate about their individual axes as they are so moved. Preferably there is provided for this purpose an actuating member 25 in the form of a cap having a cylindrical portion screw threaded onto the body 12 and having an inwardly extending flange 26 which is provided with an opening 27 into which the jaws 16 extend. The flange 26 is provided on its inner side with an annular member or projection 28 which extends about the jaws and engages the conical surfaces thereof, this engaging member preferably having an inclined surface 29 the full width of which will have contact with the conical jaws. It will be obvious therefore that the rotation of the actuating member or cap 25 in a direction to move the flange 26 thereof toward the body 12 will simultaneously rotate the jaws and press the same one toward the other and into gripping engagement with the shank of the implement. The arrangement is such that the shank engaging portions will be at all times substantially parallel one with the other but in order that they may automatically adjust themselves into true parallelism one with the other and with the axis of the chuck they are so mounted that each jaw may have a slight tilting movement transverse to its individual axis of rotation. For this purpose the supporting surface 15 is cut away on both sides of each slot to provide flat surfaces 30 with which the bases of the respective cones contact, and the base of each cone is slightly tapered outwardly from its stem 20 to impart to the same a radially inclined surface 31 which will permit the cone to adjust itself with relation to the body and to the shank of the implement, thereby insuring the proper alinement of the implement with the axis of the chuck. The actuating device or cap 25 may be adjusted in any suitable manner, as by grasping the same in the hand, but it is preferably provided with means whereby a suitable tool may be applied thereto for tightening the same and, as here shown, the outer face of the cap is provided with sockets 33 to receive the studs of a spanner wrench.

When the actuating member or cap is moved forwardly, that is away from the body 12, the jaws will be moved outwardly one from the other by springs 22, thus permitting the shank of the implement, or other driven device, to be inserted between them. The cap is then rotated on the body to move the jaws inwardly, to rotate the same about their individual axes and to move them into gripping engagement with the shank of the implement. Thus the jaws have rolling contact both with the shank and with the actuating device which tends to tighten the jaws in firm engagement with the shank and cause the gripping action of the jaws to be increased by the resistance of the work to the rotation of the implement. The rolling contact also enables the jaws to be tightened or loosened by a relatively small movement of the actuating device. The self-adjustment of the jaws, due to their tilting movement, insures the axial alinement of the implement with the chuck. Further, the rolling friction between the jaws and the actuating device minimizes wear on the parts and increases the durability of the chuck. It will be apparent that the chuck functions as a clutch and that it may be used, with or without modification, to clutch a driving member to a driven member.

It will be noted that while the jaws project into the opening 27 in the cap they do not, in any position thereof, project beyond the outer face of the cap. Consequently they cannot mar the work in the event the drill or other implement pierces the work and the pressure on the tool moves the chuck into engagement with the work. Further, the front face of the chuck is of a flat smooth construction and the cap is free from projections or angles which might injure the work if they contacted therewith. These characteristics of the chuck, together with the fact that it may be made of a size which is quite small with relation to the implement which is supported thereby, peculiarly adapt the chuck for use in close quarters, such as the limited space in which drills and other tools must be manipulated in airplane construction and the like. While the chuck may be made in small sizes, without impairing its strength or durability, it may also be made in large sizes without material change in the construction thereof.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a chuck, a rotatable body having means whereby it may be connected with the supporting member and having in the forward portion thereof a rearwardly tapered axial recess, a plurality of cone shaped jaws slidably mounted on the wall of said recess for movement toward and from the axis of said body with their conical surfaces free from contact with said body, said jaws being rotatable about individual axes and arranged to receive between them a part to be supported, and actuating means for said jaws comprising a member connected with said body for rotation and axial movement with relation thereto and extending about and engaging said plurality of jaws to simultaneously impart thereto sliding movement and rotary movement to cause said jaws to tightly grip said part to be supported.

2. In a chuck of the character described, a body having means whereby it may be connected with a supporting member and having in the forward portion thereof a rearwardly tapered axial recess and also having a substantially radial guideway in the wall of said recess, a plurality of conical jaws slidably supported on the wall of said recess for movement toward and from the axis of said body and for rotation about individual axes and adapted to receive between them a part of a device to be supported, each jaw being held against axial movement with its base in contact with said wall and having a part projecting from said base into the corresponding guideway, the taper of said jaws being so related to the angle of said wall that those portions of the conical surfaces of said jaw which engage said device are substantially parallel with the axis of said body, and means carried by said body and acting on said jaws to simultaneously impart thereto both sliding movement and rotary movement to cause said jaws to tightly grip said device.

3. In a chuck of the character described, a body having means whereby it may be connected with a supporting member and having in the forward portion thereof a rearwardly tapered axial recess and also having a plurality of substantially radial guideways in the wall of said recess, a plurality of conical jaws slidably supported on the wall of said recess for movement toward and from the axis of said body and for rotation about individual axes and adapted to receive between them a part of a device to be supported, each jaw being held against axial movement with its base in contact with said wall and having a part projecting from said base into the corresponding guideway, the base of each jaw being inclined from the axis of said jaw toward the circumference thereof to permit said jaw to have a limited tilting movement on said wall, and means carried by said body and acting on said jaws to simultaneously impart thereto both sliding movement and rotary movement to cause the jaws to tightly grip said device.

4. In a chuck, a body having means whereby it may be connected with a supporting member and having in the forward portion thereof a rearwardly tapered axial recess, an actuating device mounted on said body for both rotary and axial movement with relation thereto and having an axial opening in the forward portion thereof, and a plurality of conical jaws supported at their bases on the wall of said recess for movement toward and from the axis of said body and for rotation about their individual axes and held against rotation about the axis of said actuating device, said actuating device having a rearwardly and outwardly inclined annular surface spaced rearwardly from the forward end of said opening to engage said jaws, move the same one toward the other and to rotate each jaw about its individual axis.

5. In a chuck, a body having means whereby it may be connected with a supporting member and having in the forward portion thereof a rearwardly tapered axial recess, an actuating device mounted on said body for both rotary and axial movement with relation thereto and having a transverse portion in front of said recess and provided with an axial opening, and a plurality of conical jaws supported at their bases on the wall of said recess for movement toward and from the axis of said body and for rotation about their individual axes and held against rotation about the axis of said actuating device and extending into said opening in said actuating device, said actuating device having adjacent the rear end of said axial opening a rearwardly and outwardly inclined annular surface to engage said jaws, move the same one toward the other and rotate each jaw about its individual axis.

6. In a chuck having means whereby it may be connected with a supporting member and having a cylindrical portion provided with external screw threads, said body having in the forward end thereof a rearwardly tapered axial recess, an actuating device having screw threaded connection with said body and having a relatively thick transverse flange in front of said recess, and a plurality of conical jaws supported at their bases on the wall of said recess for movement toward and from the axis of said body and for rotation about their individual axes and held against rotation about the axis of said body, said transverse flange of said actuating device having at its rear side a rearwardly facing annular surface substantially parallel with the adjacent conical surfaces of said jaws and extending about said jaws to engage and actuate the same.

7. In a chuck, a body having means whereby it may be connected with a supporting member and having a cylindrical portion provided with external screw threads, said body having in the forward portion thereof a rearwardly tapered axial recess, a cylindrical actuating device having a rear portion screw threaded onto said body and having a forward portion in front of said recess and provided with an axial opening, said forward portion of said actuating device having adjacent the rear end of said opening rearwardly extending part adapted to enter the recess in said body and provided with a forwardly and inwardly inclined annular surface concentric with the axis of said actuating device, and a plurality of conical jaws supported at their bases in the wall of said recess for movement toward and from the axis of said body and for rotation about their individual axes and held against rotation about the axis of said actuating device, said jaws extending through said rearwardly extending part of said actuating device in operative relation to said annular inclined surface thereof with their forward ends in said opening.

8. In a chuck of the character described, a body having means whereby it may be connected with a supporting member and having in the forward portion thereof a rearwardly tapered axial recess, a plurality of conical jaws slidably mounted on the wall of said recess for movement toward and from each other and for rotation about individual axes and adapted to receive between them a part of a device to be supported, a member rotatable on and having screw threaded connection with said body, said member having an annular part extending about and engaging the conical surfaces of said jaws to rotate the latter and move the same into gripping engagement with said device when said member is rotated in one direction, said jaws having limited tilting movement with relation to said body to permit each jaw to adjust itself with relation to the other jaw.

9. In a chuck of the character described, a body having means whereby it may be connected with a supporting member and having in the forward portion thereof a rearwardly tapered recess, said body also having a plurality of substantially radial slots in the wall of said recess, a plurality of conical jaws slidably mounted on said wall of said recess and having stems extending into the respective slots, spring means acting on said jaw stems to move said jaws outwardly, and an actuating member screw threaded on said body for adjustment axially thereof and having an annular part extending about and engaging said jaws to rotate the latter and move them toward each other when said actuating member is rotated in one direction.

10. In a chuck, a body having means whereby it may be connected with a supporting member and a cylindrical portion provided in its forward end with a rearwardly tapered recess having its apex at the axis of said body and having its major diameter approximating the diameter of said body, said body having in the wall of said recess a plurality of substantially radial slots, said wall having flat surfaces on both sides of each slot, a plurality of conical jaws slidably mounted on the wall of said recess and having stems extending into the respective slots, the base of each jaw being slightly inclined to provide tiltable engagement with said flat surfaces, and an actuating device screw threaded onto said body and having a transverse portion in front of said recess provided with an axial opening, and an inwardly and outwardly inclined annular surface extending about said jaws to actuate the same.

11. In a chuck, a body having means whereby it may be connected with a supporting member and a cylindrical portion provided in its forward end with a rearwardly tapered recess having its apex at the axis of said body and having its major diameter approximating the diameter of said body, said body having in the wall of said recess a plurality of substantially radial slots, each slot having an enlarged rear portion, a plurality of conical jaws slidably mounted on the wall of said recess, each jaw having a stem extending through one of said slots and a head in the enlarged portion of said slot to hold said jaw against longitudinal movement with relation to said wall, and an actuating device screw threaded onto said body, having a part in front of said recess and provided with an axial opening and also having a rearwardly and outwardly inclined annular surface extending about said jaws to actuate the same.

12. In a chuck of the character described, a body having means whereby it may be connected with a supporting member and having in the forward portion thereof a rearwardly tapered recess, said body also having a plurality of substantially radial slots in the wall of said recess, a plurality of conical jaws slidably mounted on said wall of said recess and having stems extending into the respective slots, spring means acting on said jaw stems to move said jaws outwardly, and an actuating member screw threaded on said body for adjustment axially thereof and having an annular part extending about and engaging said jaws to rotate the latter and move them toward each other when said actuating member is rotated in one direction, the curved wall of said recess having substantially flat surfaces on both sides of each slot and the base of each conical jaw being slightly inclined from the stem toward the circumference thereof to provide an inclined area in contact with the flat surfaces of said wall.

13. In a chuck of the character described, a body having means whereby it may be connected with a supporting member and having in the forward portion thereof a rearwardly tapered recess, said body having an axial bore, a plurality of substantially radial bores extending from the periphery thereof to said axial bore, and slots connecting the respective radial bores with said recess, a plug in said axial bore closing the inner ends of said bores, a plurality of conical jaws slidably and rotatably supported on the wall of said recess, each having a stem extending through the corresponding slot and having an enlarged portion slidable in the corresponding radial bore, springs in said bores acting on the stems of said jaws to move the latter outwardly and a rotatable actuating member having screw threaded connection with said body to impart both sliding movement and rotary movement to said jaws.

MELVORNE J. McCOMBS.